United States Patent [19]
Kunze et al.

[11] Patent Number: 5,447,271
[45] Date of Patent: Sep. 5, 1995

[54] THERMOSTATIC VALVE

[75] Inventors: Juergen Kunze, Rutesheim; Evelin Weber, Ostfildern; Barbu Frunzetti, Kornwestheim, all of Germany

[73] Assignee: Behr-Thomson-Dehnstoffregler GmbH & Co., Kornwestheim, Germany

[21] Appl. No.: 239,312

[22] Filed: May 6, 1994

[30] Foreign Application Priority Data

May 6, 1993 [DE] Germany .................. 9306742 U

[51] Int. Cl.⁶ .................................. F01P 7/16
[52] U.S. Cl. ........................... 236/34.5; 137/540; 403/282
[58] Field of Search ............... 236/34, 34.5, 100; 137/540; 403/282, 349

[56] References Cited

U.S. PATENT DOCUMENTS

| | | | |
|---|---|---|---|
| 2,469,930 | 5/1949 | Payne | 236/34.5 |
| 3,580,275 | 5/1971 | Hanson et al. | 137/540 X |
| 3,640,454 | 2/1972 | Freismuth et al. | 236/34 |
| 4,176,815 | 12/1979 | Davidson et al. | 403/349 X |
| 4,280,655 | 7/1981 | Duprez et al. | 236/34.5 |
| 4,524,907 | 6/1985 | Wong | 236/100 X |
| 4,836,705 | 6/1989 | La Barge et al. | 403/282 |

FOREIGN PATENT DOCUMENTS

| | | |
|---|---|---|
| 2341355A1 | 2/1975 | Germany . |
| 2503946B2 | 8/1976 | Germany . |
| 8535987U1 | 7/1986 | Germany . |
| 9214529U1 | 1/1993 | Germany . |
| 2175673 | 5/1985 | United Kingdom . |

*Primary Examiner*—William E. Tapolcai
*Attorney, Agent, or Firm*—Evenson McKeown Edwards & Lenahan

[57] ABSTRACT

A thermostatic valve having a working element that has a housing and an extendable working piston with a valve disk. A valve seat and a closing spring which loads the valve disk in the direction of the valve seat are provided. A holder constructed as a sheet metal preform stationarily holds the housing of the working element, the holder having a flange. A connection sleeve and a housing part are provided, the flange being clampable between the connection sleeve and the housing part. The holder and the connection sleeve are connected with one another as a transportable constructional unit, the connection sleeve having an interior with at least one abutment for the closing spring. The connection between the holder and the connection sleeve is dimensioned such that the connection has a holding force which exceeds a prestressing force of the closing spring.

19 Claims, 2 Drawing Sheets

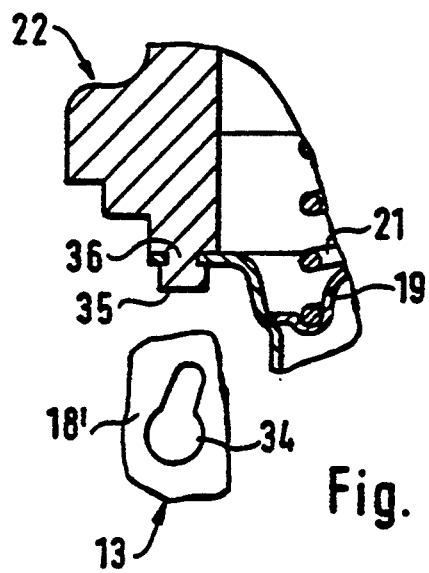
Fig. 2
Fig. 2a
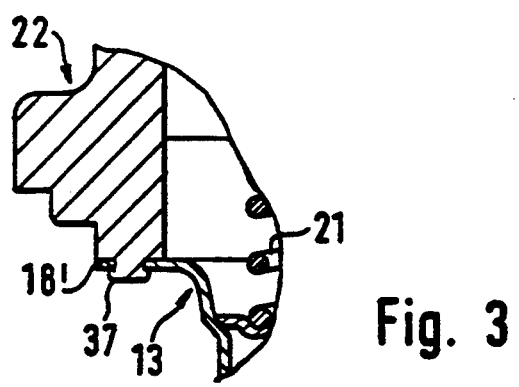
Fig. 3
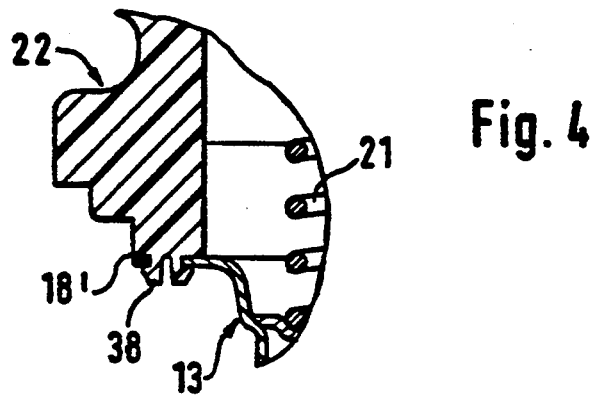
Fig. 4

THERMOSTATIC VALVE

BACKGROUND AND SUMMARY OF THE INVENTION

The present invention relates to a thermostatic valve having a working element whose housing is stationarily held by a holder constructed as a sheet metal preform and whose extendable working piston is provided with a valve disk which is loaded by means of a closing spring in the direction of a valve seat, the holder of the housing being provided with a flange which can be clamped in between a connection sleeve and a housing part.

In a thermostatic valve of the above-described type, which is known on the basis of prior public use, three sheet metal preforms are provided which together form the holder for the housing of the thermostatic working element and contain a flange and a cage-type abutment for the closing spring. The known thermostatic valve is used for controlling the coolant temperature of an internal-combustion engine of a motor vehicle. It forms a constructional unit which, when the motor vehicle engine and its connections are mounted, must be installed by the motor vehicle manufacturer between a connection sleeve or the like and a housing.

An object of the present invention is to provide a thermostatic valve improved in such a manner that its installation into a motor vehicle engine or the like is facilitated and mounting errors are largely excluded.

This and other objects are achieved in that the holder of the housing of the working element and the connection sleeve are connected with one another for producing a transportable constructional unit, in that the connection sleeve is provided in its interior with one or several abutments for the closing spring, and in that the connection between the holder and the connection sleeve is dimensioned such that it has a holding force which exceeds a prestressing force of the closing spring.

With the present invention, it is achieved that, as early as in the manufacturing plant in which the thermostatic valve is produced, its installed position with respect to the connection sleeve is determined. In a later connection to a housing of an internal-combustion engine or a water pump or the like, the mounting is therefore facilitated, thereby avoiding mounting errors. The mounting can thus be carried out by untrained personnel or personnel with little training, possibly also by means of robots. In addition, a simplification is obtained because another sheet metal preform will not be necessary since the connection sleeve is simultaneously utilized as an abutment for the closing spring. The connection sleeve and the thermostatic valve therefore form not only a transportable constructional unit but also a functional unit.

In certain embodiments of the invention, the holder is provided behind the flange with a closed collar which is assigned as a valve seat to the valve disk. This reduces the manufacturing costs because, in comparison to the known thermostatic valve, a sheet metal preform is not required, specifically the sheet metal preform which forms a valve seat. The holder, which is manufactured as a sheet metal preform, therefore has a double function.

The connection sleeve is a plastic preform in certain embodiments. Although, as a rule, the connection sleeve will be manufactured as a light-metal diecast preform, it may also be advantageous for certain applications and particularly for reasons of manufacturing costs to manufacture the connection sleeve as a plastic preform.

In certain embodiments of the invention, the holder and the connection sleeve are provided with connection elements which are engageable with one another. As a result, it is achieved that no additional connection elements are required which must be manufactured and mounted separately. The assembly and the manufacturing are therefore simplified.

Other objects, advantages and novel features of the present invention will become apparent from the following detailed description of the invention when considered in conjunction with the accompanying drawings.

BRIEF DESCRIPTION OF THE DRAWINGS

FIG. 2 is a partial sectional view of a modified embodiment in the area of the connection between the connection sleeve and a holder of the housing of the working element.

FIG. 3 is a partial sectional view similar to FIG. 2 of another embodiment in which deforming work is required for producing the connection.

FIG. 4 is a partial sectional view of another embodiment having a clip connection which is particularly suitable for a connection sleeve made of plastic.

DETAILED DESCRIPTION OF THE DRAWINGS

Figure 1:
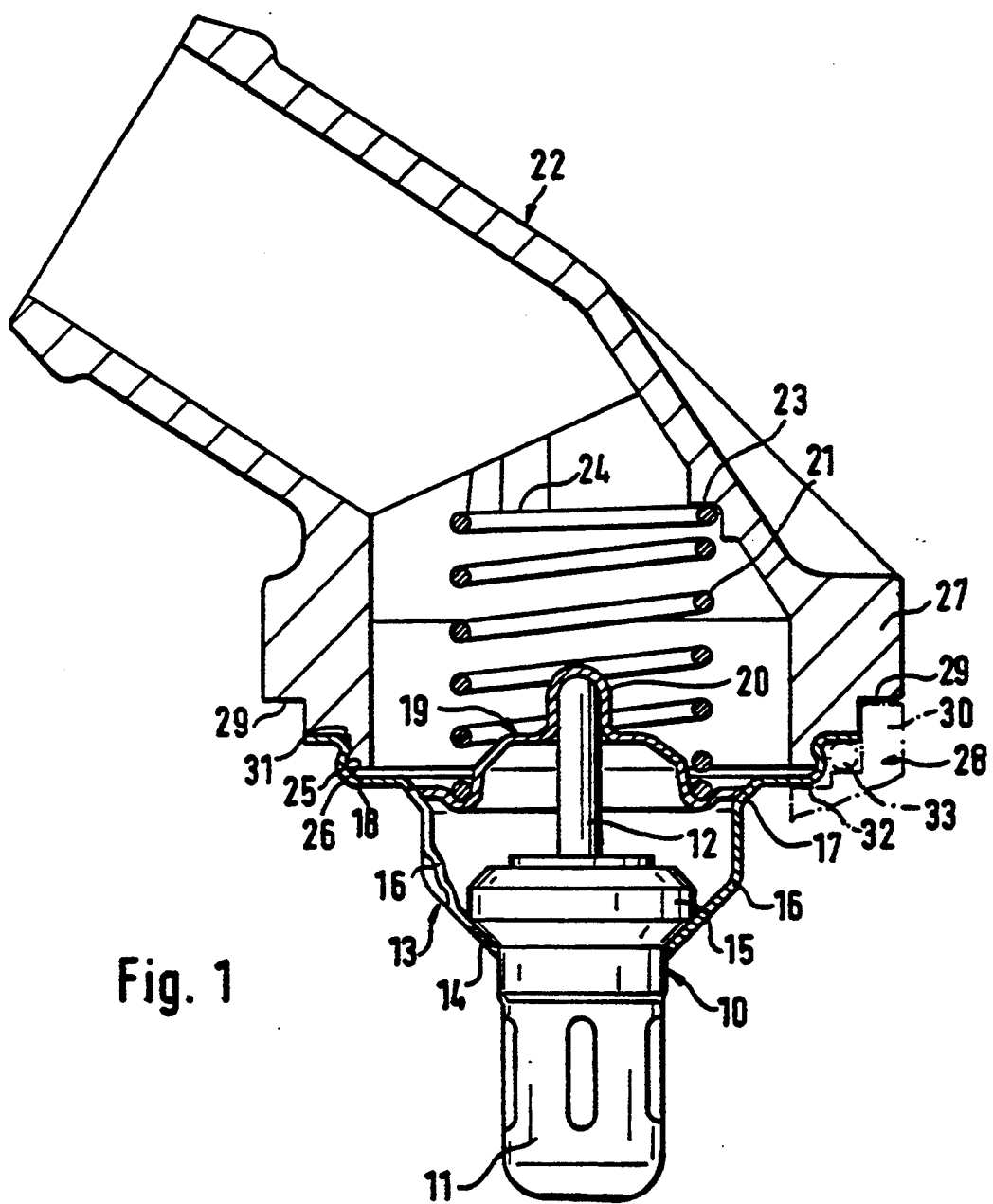
FIG. 1 is a sectional view of a thermostatic valve constructed according to an embodiment of the present invention which forms a transportable constructional unit with a connection sleeve.

The thermostatic valve illustrated in FIG. 1 comprises a thermostatic working element 10. The thermostatic working element 10 is constructed in a known manner. It comprises a housing 11 in which an expansion material, particularly a wax mixture, is housed. A working piston 12 projects into the housing 11 and is moved out of the housing when the volume of the expansion material is enlarged as a result of the temperature.

The housing 11 of the thermostatic working element 10 is held in a stationary manner by a holder 13. The holder 13 is a sheet metal preform. Brass sheet or stainless steel sheet is used as the material. The holder 13 forms an annular receiving device 14 into which the housing 11 of the working element 10 is inserted by a collar ring 15. Via two or more arms 16, the receiving device 14 is connected with a truncated-cone-shaped collar 17. This collar 17 is adjoined by a stepped flange 18 whose two sections are situated in a radial plane with respect to the housing 11 of the working element 10 and thus to the working piston 12.

On its free end, the working piston 12 carries a valve disk 19 which is fitted by a cup-type recess 20 onto the end of the working piston 12. The essentially truncated-cone-shaped collar 17 of the holder 13 which is provided with a slight step is used as a valve seat for the valve disk 19. The valve disk 19 is loaded by a closing spring 21 which, when the temperature falls and the volume of the expansion material is therefore reduced, presses the working piston 12 back into the housing 11 and closes the valve.

Together with a connection sleeve 22, the thermostatic valve forms a preassembled and therefore transportable constructional unit. In the illustrated embodiment, the connection sleeve 22 is provided with abutments 23, 24 in its interior, the prestressed closing spring 21 being supported on these abutments 23, 24. In a modified embodiment, an abutment, which is constructed as a sheet metal preform is provided for the closing spring 21. In a known manner, this abutment is connected with the holder 13 by the inserting of brackets in openings of the flange 18.

An annular groove 25 is shaped in between the two sections of the flange 18. The annular groove 25 has a semicircular cross-section. By means of this annular groove 25, the holder 13 is pushed over a torus 26 and is locked in an elastic manner.

The connection sleeve 22 is provided with a fastening flange 27 by which it is fastened to a housing 28 shown in the righthand part of FIG. 1 by an interrupted line. The fastening flange 27 is provided with a step 29 which forms a radial and an axial surface and is assigned to a centering projection 30 of the housing 28. The step 29 is followed by a step 31 which has a smaller diameter and whose axial portion is provided with a torus 26, the outer section of the flange 18 of the holder 13 resting against its radial surface. The housing 28 has a supporting surface 32 which supports the inner section of the flange 18 of the holder 13 in the installed position. The operationally occurring forces during the extending of the working piston 12 are therefore not absorbed by the detent connection (annular groove 25, torus 26) but by the supporting surface 32. Between the outer section of the flange 18 of the holder 13 and a corresponding recess of the housing 28, a sealing ring 33 is inserted. The holding force of the joining between the connection sleeve 22 and the holder 13 of the thermostatic valve must therefore only be designed such that it is larger than the prestressing force of the closing spring 21 of the "cold" thermostatic valve. It should be noted that this coordination of the holding force of the connection elements between the holder 13 and the connection sleeve 22 must be observed only when the connection sleeve 22 forms abutments 23, 24 for the closing spring 21. When, in contrast, an abutment is provided which is manufactured as a separate sheet metal preform and which is fastened to the holder 13, a coordination of the connecting forces between the connection sleeve 22 and the holder 13 with the closing spring 21 will not be necessary.

The connection between the holder 13 and the connection sleeve 22 takes place such that it applies the desired connecting forces and also provides that the holder 13 and therefore the whole thermostatic valve are correctly aligned with the connection sleeve 22. For this purpose, there are a plurality of connection possibilities.

In the embodiment according to FIGS. 2 and 2a, the holder 13 is provided in the area of its flange 18' with keyhole-type recesses 34 which have a section with a larger diameter and a section with a smaller diameter. The section with the larger diameter is in each case adapted to the heads 35 of projections shaped onto the connection sleeve 22. The section with the smaller diameter is adapted to the necks 36 of these projections. In this manner, a bayonet-type connection is provided between the holder 13 and the connection sleeve 22.

In the embodiment according to FIG. 3, the holder 13 has several perforations in the area of its flange 18 which are uniformly distributed along the circumference and through which projections 37 of the connection sleeve 22 are fitted. After being fitted through the recesses of the holder 13, these projections 37 are plastically deformed so that a type of riveted connection is created. This plastic deformation takes place by the application of corresponding mechanical forces in which case the projections 37 may possibly be heated which occurs particularly when the connection sleeve 22 is manufactured from a corresponding plastic material. In the embodiment according to FIG. 4, it is provided that the connection sleeve 22 is made of plastic. This connection sleeve 22 is provided with slotted clip projections 38 which are fitted through recesses of the flange 18' of the holder 13 and are locked in the process.

Naturally, other connection possibilities exist for connecting the holder 13 of the thermostatic valve with the connection sleeve 22, in which case it is always preferably provided that, for this purpose, connection elements exist which are each molded onto or worked into the holder 13 and/or the connection sleeve 22 so that no fastening devices are to be used which must be manufactured separately. For example, it is also provided in certain embodiments, such as according to the embodiment of FIG. 1, to construct the collar ring 26 of the connection sleeve 22 as one or several threads to which a surrounding groove of the holder 13 is assigned which is constructed correspondingly as one or several threads. In particular, when a separate spring abutment is provided, it is also possible to provide a largely force-locking connection between the connection sleeve 22 and the holder 13 of the thermostatic valve.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A preassembled constructional unit thermostatic valve assembly for installation at a support housing of a coolant system for a motor vehicle engine or the like, comprising:
   a connection sleeve,
   a thermostatic working element with a working element housing and a working piston which is movable outwardly of the working element housing as a function of temperature of the working element,
   a valve disk movable in a valve opening direction in response to a moving-out movement of the working piston from the working element housing,
   a closing spring which loads the valve disk in a valve closing direction and loads the working piston in its moving-in direction and which is prestressed for generating a prestressing force, and
   a holder which is fastened to the connection sleeve at a connection location, said holder holding the thermostatic working element, the valve disk and the closing spring on the connection sleeve with transmission of prestressing force of the closing spring at the connecting location to the connection sleeve prior to installation of the thermostatic valve assembly at the support housing, said holder being configured such that the holder is supported in an operative direction of the closing spring against the support housing so that the force of the closing spring is transmitted to the support housing when the thermostatic valve assembly is in an installed condition on the support housing, whereby prestressing spring forces acting on the working piston prior to installation at the support housing are absorbed at the connection location of the holder and connection sleeve and operationally occurring forces acting on the working piston after installation at the support housing are absorbed by the support housing.

2. A thermostatic valve assembly according to claim 1, wherein the holder is a unitary sheet member which has an annular surface flange which abuts the connection sleeve, and a closed annular collar which forms the valve seat for the valve disk.

3. A thermostatic valve assembly according to claim 1, wherein the holder is a sheet metal preform.

4. A thermostatic valve assembly according to claim 3, wherein the connection location is disposed annularly around a stepped end portion of the connecting sleeve.

5. A thermostatic valve assembly according to claim 3, wherein the holder includes an annular abutment surface in a plane which is perpendicular to a travel path of the working piston, said annular abutment surface being supportingly engaged by a support housing surface when in an installed position at the support housing.

6. A thermostatic valve assembly according to claim 2, wherein the connection sleeve is a plastic preform.

7. A thermostatic valve assembly according to claim 6, wherein the holder has a holding ring which is assigned to a collar ring of the working element housing and is connected with the annular support flange via a plurality of webs.

8. A thermostatic valve assembly according to claim 7, wherein the holder and the connection sleeve have connection elements; which are engageable with one another.

9. A thermostatic valve assembly according to claim 8, wherein the connection elements of the holder and the connection sleeve are engageable in one another in at least one of a form-locking and a force-locking manner.

10. A thermostatic valve assembly according to claim 9, wherein the connection sleeve has a torus which is surrounded by an annular recess of the holder.

11. A thermostatic valve assembly according to claim 9, wherein the connection sleeve has a plurality of projections which engage in recesses of the holder and are secured in said recesses.

12. A thermostatic valve assembly according to claim 11, wherein the projections are provided with thickened heads which reach behind the recesses of the holder.

13. A thermostatic valve assembly according to claim 1, wherein the connection sleeve is a plastic preform.

14. A thermostatic valve assembly according to claim 1, wherein the holder has a holding ring which is assigned to a collar ring of the working element housing and is connected with the annular support flange via a plurality of webs.

15. A thermostatic valve assembly according to claim 1, wherein the holder and the connection sleeve have connection elements; which are engageable with one another.

16. A thermostatic valve assembly according to claim 15, wherein the connection elements of the holder and the connection sleeve are engageable in one another in at least one of a form-locking and a force-locking manner.

17. A thermostatic valve assembly according to claim 15, wherein the connection sleeve has a torus which is surrounded by an annular recess of the holder.

18. A thermostatic valve assembly according to claim 15, wherein the connection sleeve has a plurality of projections which engage in recesses of the holder and are secured in said recesses.

19. A thermostatic valve assembly according to claim 18, wherein the projections are provided with thickened heads which reach behind the recesses of the holder.

* * * * *